US005193170A

United States Patent [19]
Lam

[11] Patent Number: 5,193,170
[45] Date of Patent: Mar. 9, 1993

[54] METHODS AND APPARATUS FOR MAINTAINING CACHE INTEGRITY WHENEVER A CPU WRITE TO ROM OPERATION IS PERFORMED WITH ROM MAPPED TO RAM

[75] Inventor: Son H. Lam, Boca Raton, Fla.

[73] Assignee: International Business Machines Corporation, Armonk, N.Y.

[21] Appl. No.: 604,837

[22] Filed: Oct. 26, 1990

[51] Int. Cl.⁵ .................. G06F 12/00; G06F 13/00
[52] U.S. Cl. ............................ 395/425; 395/400; 364/DIG. 1
[58] Field of Search ................... 395/425, 400; 364/200 MS File, 900 MS File

[56] References Cited

U.S. PATENT DOCUMENTS

| 4,392,200 | 7/1983 | Arulpragasam | 395/425 |
| 4,785,398 | 11/1988 | Joyce et al. | 364/200 |
| 5,091,846 | 2/1992 | Sachs et al. | 395/250 |
| 5,091,850 | 2/1992 | Culley | 395/400 |
| 5,119,485 | 6/1992 | Ledbetter, Jr. et al. | 395/425 |

OTHER PUBLICATIONS

80486 Microprocessor, Intel Corporation, Apr. 1989, pp. 80, 81, 83, pp. 116 and 117.

*Primary Examiner*—Joseph L. Dixon
*Assistant Examiner*—Frank J. Asta
*Attorney, Agent, or Firm*—Stephen A. Terrile

[57] ABSTRACT

Methods and apparatus for maintaining cache integrity in a computing system that includes a central processing unit (CPU), Random Access Memory (RAM), Read Only Memory (ROM), and a local memory controller for controlling cooperation between said CPU, RAM and ROM, wherein said computing system is capable of supporting a ROM mapped to RAM mode of operation, and further wherein said local memory controller, whenever said ROM mapped to RAM mode is enabled, (1) implements a snoop cycle to detect CPU write ROM operations and, upon detecting such an operation, (2) provides a cache invalidation signal to the CPU. The CPU utilizes the invalidation signal, along with the invalidation address on the local bus coupling the CPU and memory controller, to invalidate any cache data entry corresponding to the main memory address targeted by the CPU write ROM operation. The invalidation takes place while the write operation is in progress.

18 Claims, 6 Drawing Sheets

METHODS AND APPARATUS FOR MAINTAINING CACHE INTEGRITY WHENEVER A CPU WRITE TO ROM OPERATION IS PERFORMED WITH ROM MAPPED TO RAM

BACKGROUND OF THE INVENTION

1. Field of the Invention

The invention relates generally to methods and apparatus for maintaining the integrity of cache memory data in a computing system that includes a central processing unit (CPU) and associated cache memory, Random Access Memory (RAM), Read Only Memory (ROM), and a local memory controller for controlling cooperation between the CPU and the aforementioned memories. More particularly, the invention relates to methods and apparatus for maintaining cache integrity in a computer system, like the one described hereinabove, in which a ROM mapped to RAM mode of operation is supported, and a CPU write to ROM operation is performed while the ROM mapped to RAM mode is enabled.

2. Description of the Related Art

Well known computer systems, such as the IBM PS/2 Model 70 personal computing system, support mapping ROM to RAM to improve system operating speed. The terms IBM and IBM PS/2 are registered trademarks of INTERNATIONAL BUSINESS MACHINES CORPORATION.

It is also well known to perform "snoop" operations in computer systems which, as defined herein, are operations performed by a system device in an attempt to detect the presence (or alternatively the absence) of a predefined signal or set of signals. For example, in computer systems that include cache memory, snoop cycles have been implemented by local memory controllers to detect external write operations to main memory (e.g., a write being performed by an external bus master) involving data in a cache under the control of a particular memory controller. If such a write operation is detected during a local memory controller snoop cycle, a known response by the controller is to provide an invalidation signal and cache address signal to the local CPU so that the appropriate cache entry can be invalidated by the local CPU.

However, no computer system is known that (1) supports mapping ROM to RAM and (2) protects against data being destroyed in cache memory if a CPU write to ROM operation is performed when the aforesaid mapping is enabled. Although a write ROM operation will not be successful in modifying the contents of ROM; if ROM data is mapped to RAM and is cached on a fetch preceding a CPU write to ROM operation, the potential clearly exists for creating invalid cache data when the CPU write to ROM operation is performed. Such potential exists since each CPU is normally responsible for updating data in any cache memory associated with the processor, invalidating non current cache data values, etc.

Accordingly, it would be desirable if methods and apparatus were provided that would assure the integrity of data in cache memory whenever a CPU write to ROM operation is performed with ROM mapped to RAM. It would also be desirable if such methods and apparatus could be implemented using existing system components (memory controllers, CPUs, etc.) without introducing additional hardware into the computer system.

Furthermore, it would be desirable if the contemplated methods and apparatus performed the necessary functions to maintain cache integrity in parallel with the performance of the CPU write to ROM operation.

Still further, it would be desirable if a snoop cycle could be implemented in the memory controller responsible for cooperating with a given CPU, during which ROM write operations performed by the CPU (with ROM mapped to RAM) could be detected.

Further yet, it would be desirable if existing signalling protocols for invalidating cache entries (to maintain cache integrity) could be utilized in conjunction with the aforementioned snoop cycle for detecting CPU write to ROM operations, so that the overall design and the complexity of the computer system would not need to be changed in order to perform the desired cache invalidation procedure.

SUMMARY OF THE INVENTION

It is a principal object of the invention to provide methods and apparatus for assuring the integrity of data in cache memory whenever a CPU write to ROM operation is performed with ROM mapped to RAM.

It is a further object of the invention to provide methods and apparatus for detecting CPU write to ROM operations whenever a ROM mapped to RAM mode is supported by the computer system and said mode is enabled.

It is still a further object of the invention to provide methods and apparatus which utilize existing cache entry invalidation signalling protocols to maintain cache integrity, whenever a CPU write to ROM is performed when ROM is mapped to RAM.

It is yet a further object to be able to utilize local memory controllers to perform the functions contemplated by the invention by implementing a snoop cycle in such controllers for detecting CPU write to ROM operations whenever ROM is mapped to RAM.

According to the invention, whenever a CPU performs a write to ROM space, and the ROM mapped to RAM mode is enabled, the local memory controller, coupled to the CPU by a local bus, (1) implements a snoop cycle to detect the CPU write ROM operation and, upon detecting such an operation, (2) provides a cache invalidation signal to the CPU. The CPU utilizes the invalidation signal, along with the invalidation address already on the local bus (the CPU specified ROM write address), to invalidate any cache data entry corresponding to the main memory address targeted by the CPU write ROM operation. The invalidation takes place while the write operation is in progress.

The invention features methods and apparatus which maintain cache integrity in computing systems that support a ROM mapped to RAM mode of operation, when a CPU write to ROM is performed with the ROM mapped to RAM mode enabled.

Further features of the invention include the implementation and utilization of a memory controller snoop cycle to detect CPU write to ROM operations when the ROM mapped to RAM mode is enabled; utilization of the aforesaid memory controller to provide a cache entry invalidation signal upon detecting a CPU write to ROM operation when ROM is mapped to RAM; and utilization, by the CPU, of the address signal on the local bus (placed on the local bus by the CPU performing a write to ROM operation), to determine the address of any associated cache memory entry to be invalidated whenever the aforementioned invalidation signal is provided to the CPU by the local memory controller.

These and other objects and features will be recognized by those skilled in the art upon reviewing the detailed description set forth hereinafter in conjunction with the accompanying Drawing.

BRIEF DESCRIPTION OF THE DRAWING

FIG. 4 is a simplified block diagram of particular portions of a computer system, like the one depicted in FIG. 3, useful in explaining the principles of the invention. In particular, FIG. 4 depicts the interconnection between a CPU, its associated cache memory, RAM and ROM; where a local memory controller is utilized to manage cooperation between the CPU and the aforementioned memories.

DETAILED DESCRIPTION

While the present invention will be described more fully hereinafter with reference to the accompanying drawings, in which illustrative embodiments of the present invention are shown, it is to be understood at the outset of the description which follows that persons skilled in the art may modify the invention described herein, while still achieving the favorable results contemplated by the invention. Accordingly, the description which follows is to be understood as being a broad, teaching disclosure directed to persons of skill in the appropriate arts, and is not intended to limit the scope of the present invention.

Figure 1:
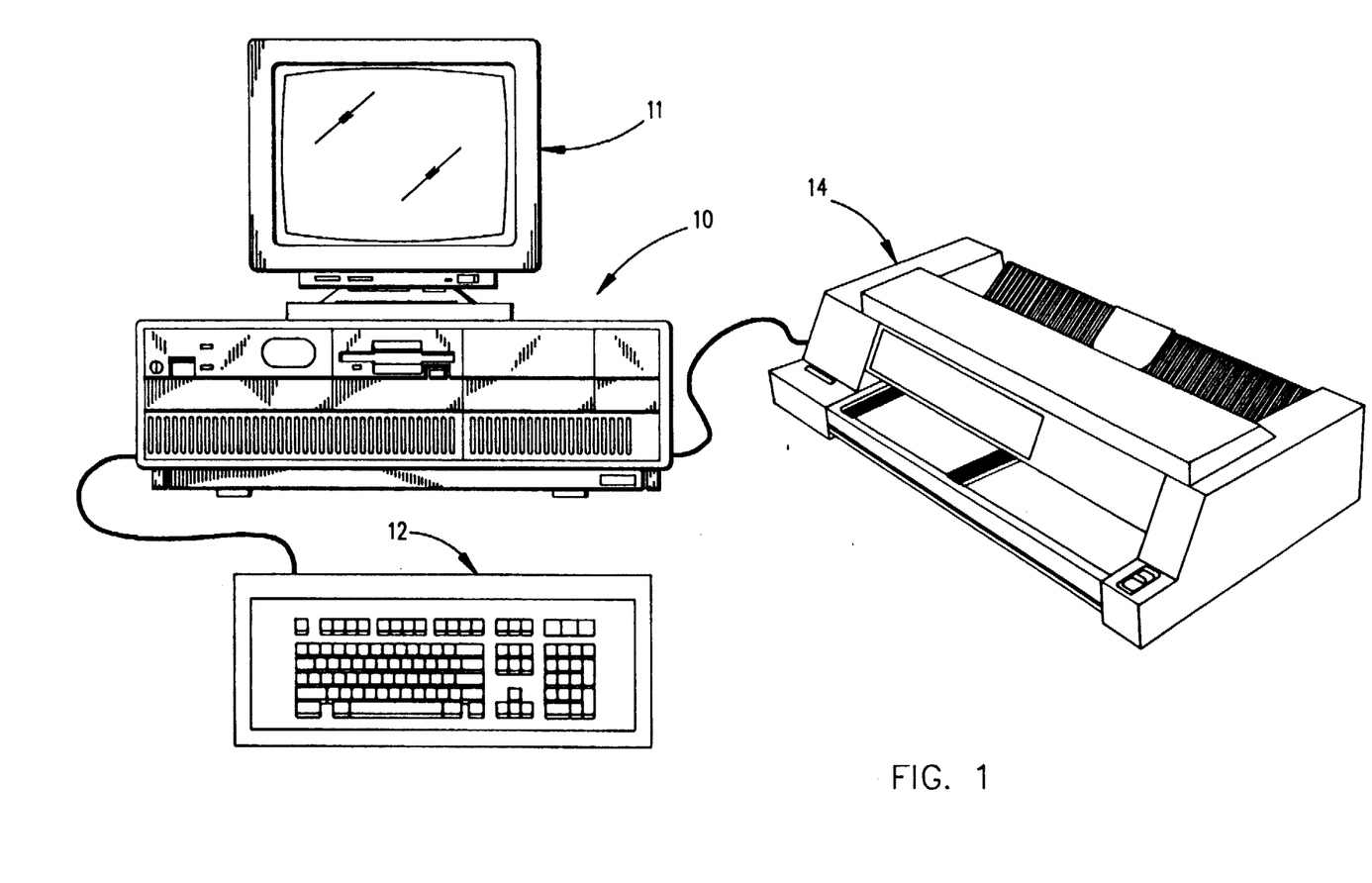
FIG. 1 is a perspective view of a personal computer embodying the present invention.

Referring now more particularly to the accompanying drawings, an example of a microcomputer which could embody (and support) the present invention is shown and generally indicated at 10 (FIG. 1). Computer system 10 may have an associated monitor 11, keyboard 12 and printer or plotter 14. The computer 10 has a cover 15 formed by a decorative outer member 16 (FIG. 2) and inner shield member 18 which cooperate with a chassis 19 in defining an enclosed, shielded volume for receiving electrically powered data processing and storage components for processing and storing digital data. At least certain of these components are mounted on a planar 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
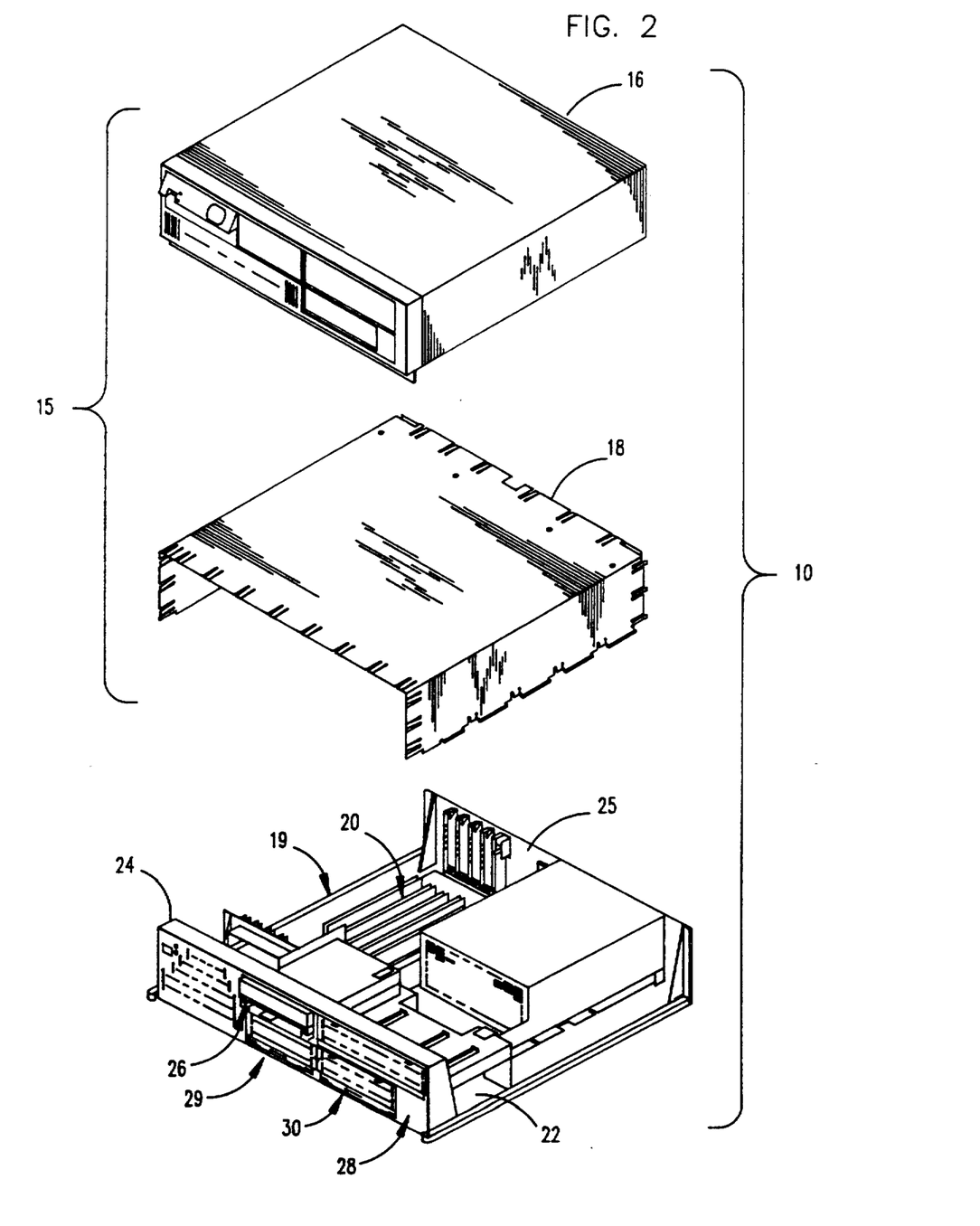
FIG. 2 is an exploded view of certain elements of the personal computer of FIG. 1.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other bay 28 is adapted to receive drives of a selected one of two sizes (such as 3.5 and 5.25 inch) and the lower bays are adapted to receive devices of only one size (3.5 inch).

Figure 3:
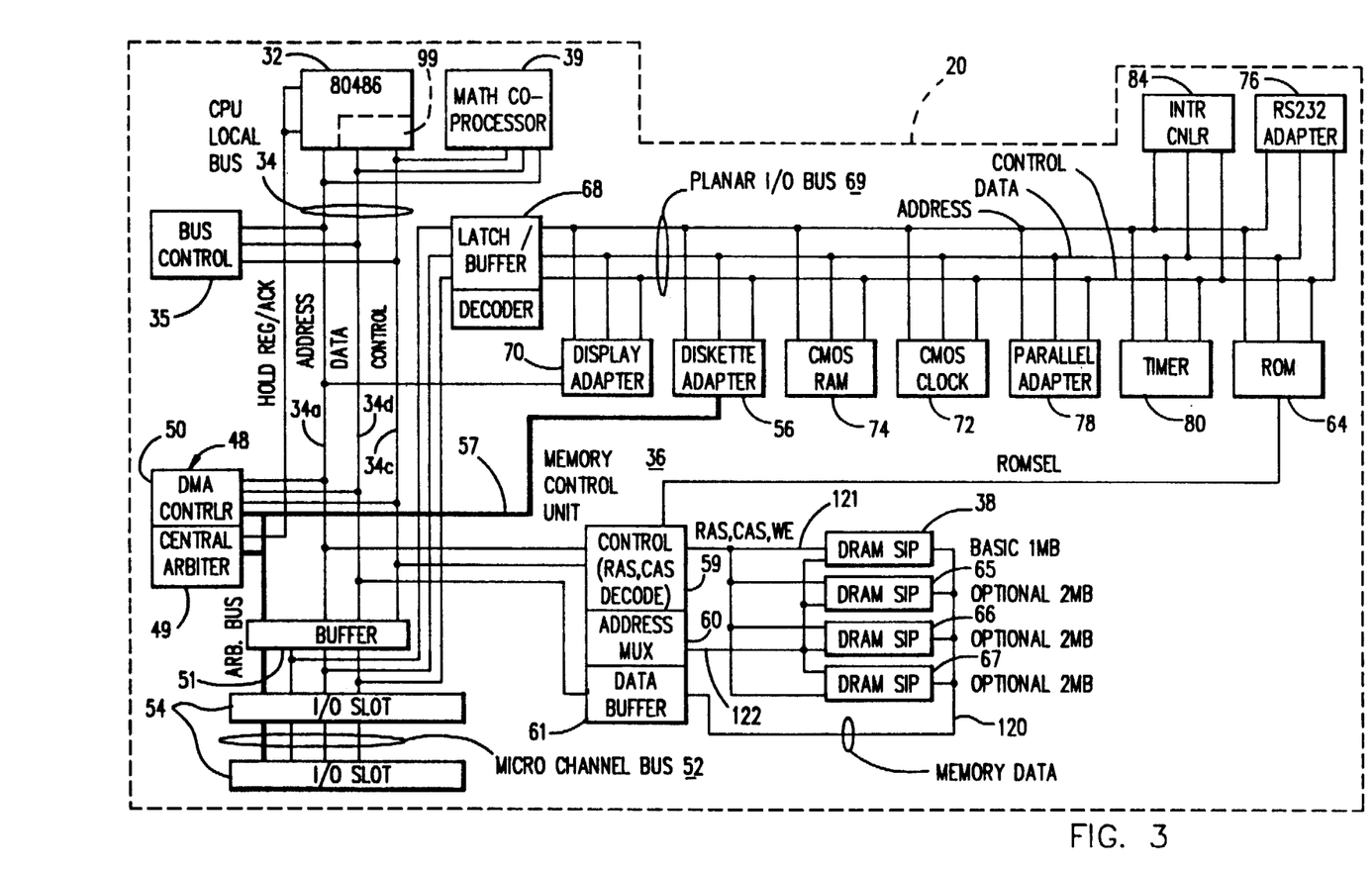
FIG. 3 is a block diagram of the personal computer system depicted in FIGS. 1 and 2, which illustrates in detail one type of computer architecture in which the present invention may be advantageously used.

Prior to relating the above structure to the present invention, a summary of the operation in general of the personal computer system 10 may merit review. Referring to FIG. 3, there is shown a block diagram of a personal computing system illustrating the various components of computer system 10. The system shown in FIG. 3 includes components mounted on the planar 20 and the connection of the planar to the I/O slots and other hardware of the personal computer system. Connected to the planar is the system processor 32 comprised of a microprocessor (e.g., the 80486 microprocessor shown in FIG. 3) which is connected by a high speed CPU local bus 34 through a bus control timing unit 35 which is further connected to a volatile random access memory (RAM) 38.

While the present invention will be described hereinafter with reference to portions of the system block diagram shown in FIG. 3 (in particular, those portions of FIG. 3 depicted in FIG. 4 in solid lines), it is to be understood at the outset of the description which follows that the invention may be used with other hardware configurations. For example, FIG. 3 depicts, for the sake of illustration only, CPU 32 as an 80486 microprocessor. The 80486 includes cache memory (as indicated by the dashed lines within CPU 32 and reference numeral 99). However, in a different hardware configuration cache memory could be located outside (and nevertheless be associated with) a processor, such as an 80386, etc., without departing from the spirit or scope of the invention described herein.

Returning now to FIG. 3, the CPU local bus 34 (comprising data, address and control components 34D, 34A, 34C) provides for the connection of the microprocessor 32 and (optionally) a math coprocessor 39. Also coupled on the CPU local bus 34 is a buffer 51. The buffer 51 is itself connected to a Micro Channel bus 52. Micro Channel is a registered trademark of the INTERNATIONAL BUSINESS MACHINES CORPORATION. The bus 34 is further connected to a DMA unit 48 comprised of a central arbitration unit 49 and DMA controller 50. The buffer 51 provides an interface between the local bus 34 and an optional feature bus such as the Micro Channel bus 52. Connected to the bus 52 are a plurality of I/O slots 54 for receiving adapter cards each of which may be further connected to an I/O device or memory.

An arbitration control bus 57 couples the DMA controller 50 and central arbitration unit 4 to the I/O slots 54 and a diskette adapter 56. Also connected to the local bus 34 is a memory control unit 36 which is comprised of a memory controller 59, and address multiplexor 60, and data buffer 61. The memory control unit 36 is further connected, via buses 120-122, to a random access memory as represented by the RAM module 38. Bus 120 carries memory data, bus 121 carries control signals and bus 122 carries address signals.

The memory control unit 36 includes the logic for mapping addresses to and from the microprocessor 32 to particular areas of RAM 38. This logic can be used, for example, to reclaim RAM previously occupied by the Basic Input Output System (BIOS). BIOS is a well known system used to interface between the I/O devices attached to system 10 and the operating system of microprocessor 32. BIOS is typically stored in ROM 64 and can be copied into RAM 38 to decrease the execution time of BIOS if a ROM mapped to RAM mode is enabled and supported by computer system 10. Such a situation (i.e., where ROM is mapped to RAM) provides an excellent example of where the present invention may be advantageously used to assure the integrity of data in the cache memory associated with CPU 32.

In the computer system depicted in FIG. 3, memory control unit 36 also generates a ROM select signal (ROMSEL), that may be used to enable or disable ROM 64. If ROM 64 is enabled, BIOS is executed out of ROM. If ROM 64 is disabled, the ROM is not responsive to address inquiries from the microprocessor 32 (i.e. BIOS is executed out of RAM).

For the purposes of illustration only, the present invention is described with reference to a microcomputer system 10 shown with a basic 1 MB (megabyte) RAM module 38. Those skilled in the art will appreciate that additional memory can be interconnected as represented in FIG. 3 by optional memory modules 65-67. It should be noted that RAM 38 is sometimes referred to herein as "main memory".

A further buffer, 68, is shown in FIG. 3 to be coupled between the bus 52 and a planar I/O bus, 69. Buffer 68 is effectively the interface between buses 52 and 69. The planar I/O bus 69 includes address, data, and control components respectively. Coupled along the planar bus 69 are a variety of I/O adapters and other components such as the display adapter 70 (which is used to drive the monitor 11), a clock 72, nonvolatile RAM 74, hereinafter referred to as NVRAM, a RS232 adapter 76, a parallel adapter 78, a plurality of timers 80, the aforementioned diskette adapter 56, an interrupt controller 84, and the aforementioned ROM 64. As indicated hereinbefore, ROM 64 may be used to store BIOS, as well as other important programs and data sets such as the IBM PS/2 Model 70 system initialization program "POST".

The clock 72 shown in FIG. 3 may be used for time of day calculations. The NVRAM may be used to store system configuration data. For example, the NVRAM could, in one computer architecture that supports the invention, be used to contain information describing the capacity of a fixed disk or diskette, the type of display, the amount of memory, time, date and, whether or not system 10 is able to support a ROM mapped to RAM mode of operation, etc.

NVRAM data bits could, for example, be used by memory controller 59 to determine whether ROM is mapped to RAM (via a mode enable bit); whether BIOS is run out of ROM or RAM; whether to reclaim RAM intended to be used by BIOS RAM, etc. Alternatively, such information could be stored locally in the memory controller.

As indicated hereinbefore, the invention may be used in computer architectures other than the one depicted in FIG. 3, such as where a memory controller is coupled to Micro Channel bus 52 via a bus interface unit (BIU) serving as an interface between the memory controller and Micro Channel bus; such as where the memory controller contains the mode bit referred to hereinbefore, etc. Accordingly, those skilled in the art will readily appreciate, with reference to the description to be set forth hereinafter, that the particular computer architecture in which the invention may be advantageously used is not intended in any way to limit the scope of the invention per se.

Figure 4:
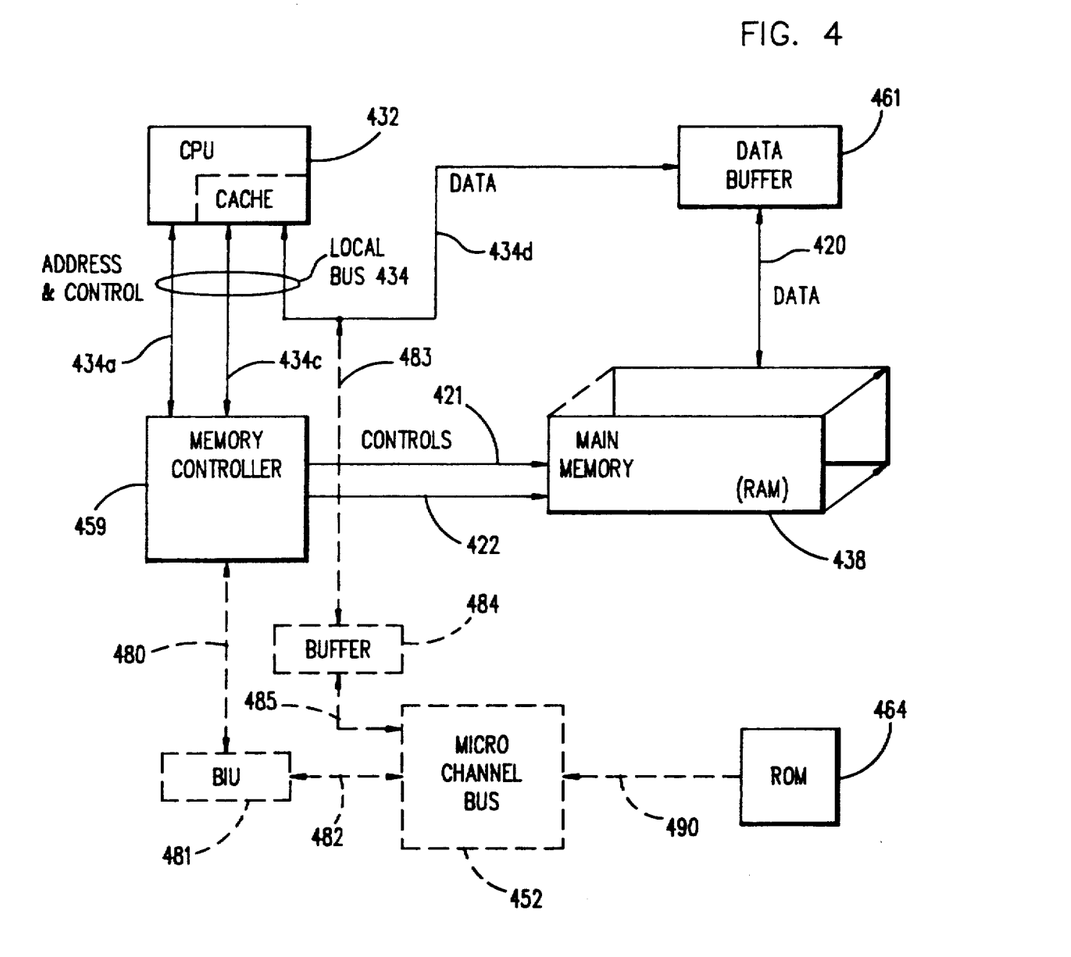

Having described a computer architecture in which the invention may be advantageously used, attention is directed to FIG. 4 which depicts, in simplified form, those portions of such a computer system useful in explaining the principles of the invention.

In particular, the simplified block diagram in FIG. 4 focuses on the interconnection between a CPU, its associated cache memory, RAM and ROM; where a local memory controller is utilized to manage cooperation between the CPU and the aforementioned memories.

The correspondence between certain ones of the devices and buses depicted in FIGS. 3 and 4 is as follows: CPU 432 (of FIG. 4) corresponds to CPU 32 (of FIG. 3); memory controller 459 corresponds to memory controller 59; data buffer 461 corresponds to data buffer 61; RAM 438 corresponds to RAM 38; ROM 464 corresponds to ROM 64; Micro Channel bus 452 corresponds to Micro Channel bus 52; local bus 434 corresponds to local bus 34; the address, control and data components of local bus 434 (434A, 434C and 434D) correspond to local bus 34 components 34A, 34C and 34D respectively; and buses 420-422 correspond respectively to buses 120-122.

FIG. 4 also shows memory controller 459 and CPU 32 coupled to ROM 464 via Micro Channel bus 452. These connections (via buses 480, 482, 483 and 485), together with Micro Channel bus 452, bus interface unit 481 and buffer 484, are all shown in dashed lines to indicate that: (1) the invention could be practiced in a computer architecture like the one in FIG. 3 (i.e., with ROM coupled to the Micro Channel bus via a planar bus, latch/buffer decoder, etc.), not requiring a BIU, etc.; (2) alternatively, the invention could be practiced in some other computer architecture such as one using all of the components in depicted in FIG. 4 (including those shown using dashed lines), i.e., where memory controller 459 is coupled to ROM 464 via a BIU 481, and data is buffered between Micro Channel bus 452 and CPU 432 via buffer 484; (3) the invention could be practiced without a Micro Channel bus all together in, for example, computer architectures where ROM is coupled to the memory controller via the local bus, and (4) in still other computer architectures, all without departing from the spirit or scope of the invention.

It is important to realize that the invention may be practiced in the context of any of a variety of computer architectures, by implementing a special purpose memory controller snoop cycle (described in detail hereinafter with reference to FIGS. 5 and 7), when the ROM mapped to RAM mode of the computer system is enabled. As indicated hereinbefore, the NVRAM shown in FIG. 3 (RAM 74) is only one vehicle that may be used to store the aforementioned mode enabled bit used by the memory controller to determine whether ROM is mapped to RAM. Alternatively, as previously pointed out, the memory controller itself may be used to store mode information, etc.

The special purpose snoop cycle contemplated by the invention according to one embodiment of the invention, operates in the manner depicted in the flowchart shown in FIG. 5, which will now be described with reference to both FIGS. 4 and 5.

Figure 5:
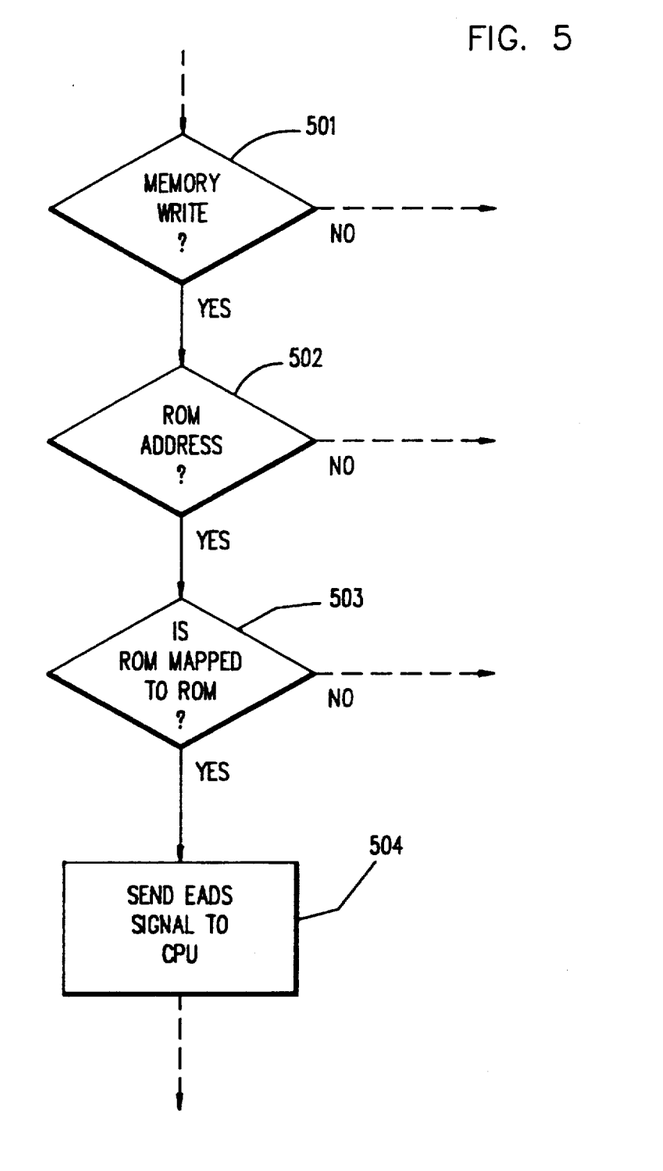
FIG. 5 is a flowchart indicating the decision functions performed by a local memory controller, built in accordance with the teachings of the invention, in performing the snoop cycle contemplated by the invention; where the memory controller provides an invalidation signal to the CPU whenever a CPU write to ROM operation is performed with ROM mapped to RAM.

In particular, memory controller 459 first determines if a memory write cycle has started (block 501 of FIG. 5), and if so, determines whether or not a ROM address is on local bus 434 (block 502 of FIG. 5). This is one form of snooping that can be implemented by memory controller 459 to practice the invention. The determinations made at blocks 501 and 502 in FIG. 5 (the order of which is unimportant) can be made based on control and address signals provided to memory controller 459 on local bus 434 (via local bus components 434A and 434C).

If the determination made at block 501, 502 or 503 of FIG. 5 is "no", then obviously no further determination needs to be made by controller 459 to maintain cache integrity in support of the aforementioned objects of the invention. For example, a ROM read operation may be in progress and cause the determination made at block 501 to be "no". It should be noted that if ROM is mapped to RAM and occupies, for example, 128K of RAM (e.g., address range 896K to 1024K of RAM); then any fetches from address space 896K to 1024K are typically cacheable on a CPU ROM read. That is, on a CPU ROM read the data is fetched directly from address space 896K to 1024K if the target data is not already in cache; otherwise the CPU will fetch the data from its cache.

Those skilled in the art will readily appreciate that although there is no potential for the integrity of cache data to be adversely affected by ROM read operations; such is not the case for a CPU write to ROM operation.

As indicated hereinabove, a CPU write to ROM operation should not occur. However, if such an operation is performed, memory controller 459 will forward the CPU cycle (where ROM is coupled to the memory controller via the Micro Channel bus depicted in FIG. 4), to the Micro Channel bus. In non Micro Channel bus architectures, the CPU cycle would be forwarded to, for example, the local bus, etc. In the remainder of the description being set forth herein, it will be assumed, for the sake of illustration only, that a Micro Channel bus is included in the computer architecture.

At approximately the same time that memory controller 459 forwards the CPU cycle to Micro Channel bus 452 (for a write ROM operation with ROM mapped to RAM), CPU 432 will modify its associated cache if the target ROM data was previously cached. This modification of data in a cache associated with CPU 432 may result in the destruction of the ROM data stored therein.

To solve this problem, the invention calls for memory controller 459 to provide a cache entry invalidation signal to CPU 432 upon detecting a CPU write to ROM when ROM is mapped to RAM. CPU 432 will respond to such a signal by invalidating the cache entry corresponding to the target of the write ROM operation while the operation is being performed.

In order to understand how this accomplished, reference should again be made to the flowchart depicted in FIG. 5. If the answer is "yes" to both the start of a memory write cycle and a ROM address being on the local bus; then memory controller 459 can, according to one embodiment of the invention, check to see if the ROM mapped to RAM mode is enabled. As indicated hereinabove, one way to do this is to check the value of a mode enable bit.

If the answer to the question shown in block 503 of FIG. 5 is also "yes" (i.e., the ROM mapped to RAM mode is enabled), then memory controller 459 can simply drive the aforementioned invalidation signal to CPU 432 via local bus 434. This will effectively take place at the same time that the CPU cycle is forwarded to the Micro Channel bus.

In the computer system depicted in FIG. 4, the memory controller 459 also drives a system address status signal (SADS) onto link 480. Assuming a BIU interface with Micro Channel bus 452 on link 482, Micro Channel bus 452 responds to address and control signals supplied by memory controller 459 (via the BIU) by not permitting the write to ROM space.

In parallel, CPU 432 will respond to the receipt of the invalidation signal over the local bus by invalidating the cache entry corresponding to the address already on the local bus (put there by the CPU itself). This can be accomplished in a manner similar to known cache invalidation signal protocols in which all the processor needs to invalidate a particular cache entry is an invalidation address and invalidation signal.

Such a protocol is employed in the IBM PS/2 Model 70 to detect external write operations to main memory (e.g., a write being performed by an external bus master), involving data in a cache under the control of a particular local memory controller. If such a write operation is detected during a local memory controller snoop cycle, a known response (as indicated hereinbefore) is for the memory controller to provide the invalidation signal and cache address signal to the local CPU so that the appropriate cache entry can be invalidated by the local CPU.

Figure 6:
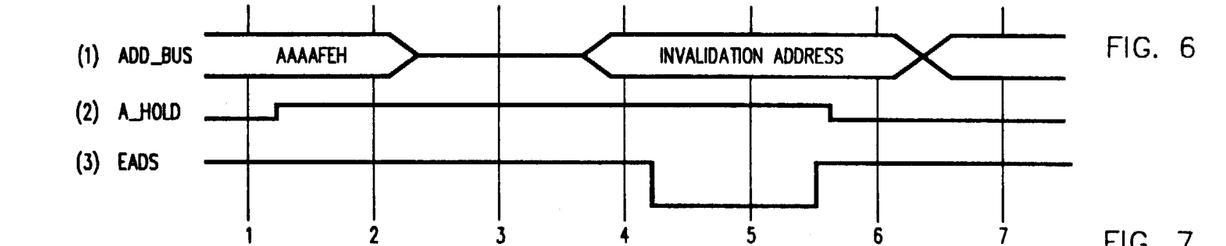
FIG. 6 is a timing diagram that indicates an exemplary sequence of events that take place when a prior art local memory controller implements and utilizes a snoop cycle to maintain the integrity of cache data.

FIG. 6 is a timing diagram that indicates an exemplary sequence of events that take place when such a prior art local memory controller implements and utilizes a snoop cycle to maintain the integrity of cache data.

In particular, in line 1 of FIG. 6 (labeled "ADD_BUS") a CPU 432 address, "AAAAFEH" (output onto local bus 434 of FIG. 4) is shown driven by the CPU onto the local bus until just after the start of cycle 2, where illustrative cycles 1-7 are shown in FIG. 6.

Line 2 of FIG. 6, labeled "A_HOLD", is a signal output by memory controller 459 of FIG. 4 (for example, a memory controller of the type incorporated into the PS/2 Model 70), to get CPU 432 to release the local bus. Memory controller signalling of this type is known to take place, for example, upon detection of a bus master write to cacheable memory space (referred to hereinbefore), using prior art snooping techniques.

Alternatively, prior art memory controllers can also be designed to recognize a write to the cacheable memory space by another microprocessor (for example, another 80486) on the Micro Channel bus, or even a write to cacheable memory space by some other microprocessor on the local bus.

Those skilled in the art will readily appreciate that, in any of the aforementioned situations involving a write to cacheable memory space (other than a write to ROM space with ROM mapped to RAM), memory controllers are known which take control of the local bus (via an A_HOLD type signal shown on the second line of FIG. 6), and then send both the address of the cache memory entry to be invalidated by the relevant CPU, together with the invalidation signal to trigger the invalidation, over the local bus to the relevant CPU.

This sequence of events is represented in FIG. 6 with the A_HOLD cycle going high during cycle 1 (signalling the memory controllers desire to take over the local bus); the CPU releasing the local bus during cycle 2; the memory portion of the local bus (during cycle 3— shown on the first line of FIG. 6); followed by an invalidation signal being driven by the memory controller during cycle 4. The invalidation signal used by the invalidation signalling protocol employed in the IBM PS/2 Model 70, is the external address status signal (EADS). Accordingly, the signal on line 3 of FIG. 6 is labeled EADS.

The CPU, upon receipt of the invalidation address and the invalidation signal over the local bus (both driven by the memory controller), can then proceed to invalidate the appropriate cache entry.

Figure 7:
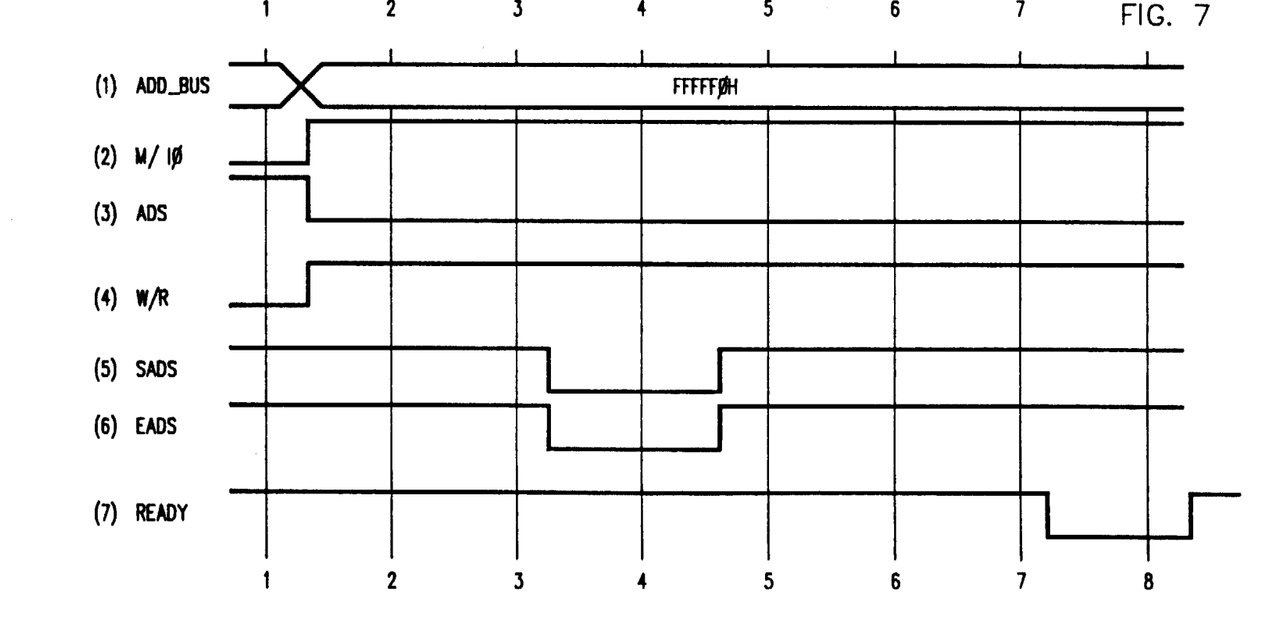
FIG. 7 is a timing diagram that indicates an exemplary sequence of events that take place, in accordance with one embodiment of the invention, when a local memory controller is used to maintain the integrity of cache data while a CPU write to ROM operation is being performed with ROM mapped to RAM.

By way of comparison, FIG. 7 depicts a timing diagram which indicates (over an 8 cycle period) an exemplary sequence of events that take place when, in accordance with one embodiment of the invention, a local memory controller is used to maintain the integrity of cache data while a CPU write to ROM operation is being performed with ROM mapped to RAM.

In particular, line 1 of FIG. 7 again depicts the address portion of the local bus (ADD_BUS). In this instance however, sometime after the start of cycle 1, the CPU write to ROM operation is performed with an exemplary ROM address, FFFFF0H, appearing on the local bus. Lines 2, 3 and 4 of FIG. 7 show other signals driven by the CPU in the performance of the write to ROM operation.

In particular, in line 2, a "M/IO" signal is shown, which is, for the sake of illustration, assumed to be low to indicate an I/O cycle, and assumed to be high to indicate a memory cycle. Thus, it can be seen with reference to FIG. 7 that the signal on line 2 goes high coincidentally with the start of the write to ROM operation.

The signal on line 3 of FIG. 7 is an address status signal ("ADS"), which, when low, is typically used to inform the memory controller that a cycle (memory or I/O cycle) is starting. This signal can also be seen to be driven by the CPU during the performance of the write to ROM operation.

The signal on line 4 of FIG. 7 (again driven by the CPU) is a write/read signal ("W/R"), which for the sake of illustration is presumed to be high during a write cycle. It may be seen with reference to FIG. 7 that the W/R signal is high during the performance of the CPU write to ROM operation.

The next two lines in FIG. 7 (lines 5 and 6), illustrate signals driven by the memory controller, in accordance with the teachings of the invention, upon detection of the CPU write to ROM operation.

Before explaining the purpose of lines 5 and 6 of FIG. 7, it should be noted that the snoop operation contemplated by the invention, can be performed by the memory controller checking to see if (1) the ADD_BUS signal (shown on line 1 of FIG. 7) is in ROM space (when ROM is mapped to RAM), when (2) a memory write cycle is in progress (as can be determined from the CPU output signals shown on lines 2 and 4 of FIG. 7).

These determinations correspond to those illustrated in blocks 501 and 502 of FIG. 5.

As for lines 5 and 6 of FIG. 7, the SADS signal referred to hereinbefore (used to forward the CPU cycle to the Micro Channel bus in an illustrative embodiment of the invention), is shown (on line 5) driven by the memory controller during cycle 4; while the invalidation signal (the external address status signal "EADS" in the IBM PS/2 Model 70) is shown (on line 6) as also being driven by the memory controller during cycle 4. With reference to FIG. 4, it should be noted that the SADS signal is output on bus 480; while the EADS signal is output on local bus 434.

It should also be noted, that the invalidation address required by the CPU is already on the address portion of the local bus (being put there by the CPU itself during the performance of the write to ROM operation). Thus, in contrast to the sequence of events depicted in FIG. 6, no A_HOLD signal need be generated by the memory controller to accomplish the results desired by the sequence of events depicted in FIG. 7.

Finally, line 7 of FIG. 7 depicts a "READY" signal that is output by the memory controller to indicate that the write cycle is completed.

What has been described in detail hereinabove are methods, apparatus and computer systems meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A method for maintaining cache integrity in a computer system that includes a central processing unit (CPU), cache memory associated with said CPU, Random Access Memory (RAM), Read Only Memory (ROM), a local memory controller for controlling cooperation between said CPU, cache memory, RAM and ROM, and a local bus for interconnecting said local memory controller and said CPU, wherein said computer system is capable of supporting a cacheable ROM mapped to RAM mode of operation, comprising the steps of:
    (a) implementing a local memory controller snoop cycle to detect CPU write to ROM operations whenever said cacheable ROM mapped to RAM mode is enabled; and
    (b) providing a cache entry invalidation signal to said CPU whenever, a CPU write to ROM operation is detected with cacheable ROM mapped to RAM.

2. A method as set forth in claim 1 wherein said cache entry invalidation signal is provided to said CPU via said local bus.

3. A method as set forth in claim 1 further comprising the step of utilizing said CPU, in response to said invalidation signal, to invalidate any cache entry in said cache memory corresponding to a data entry located at a target address of said CPU write ROM operation.

4. A method as set forth in claim 1 further comprising the steps of:
   (a) placing a target address of said CPU write to ROM operation on said local bus; and
   (b) utilizing said CPU to invalidate any cache entry corresponding to the address on said local bus whenever said invalidation signal is provided to said CPU.

5. A method as set forth in claim 1 wherein said step of implementing a local memory controller snoop cycle further comprises the steps of:
   (a) determining if a memory write cycle has been initiated by said CPU;
   (b) determining if a ROM space address is on said local bus; and
   (c) determining if the cacheable ROM mapped to RAM mode of operating said computer system is enabled.

6. A method for operating a memory controller to maintain cache integrity in a computer system that includes a central processing unit (CPU), cache memory associated with said CPU, Random Access Memory (RAM), Read Only Memory (ROM), and a local bus for interconnecting said memory controller and said CPU, wherein said computer system is capable of supporting a cacheable ROM mapped to RAM mode of operation, comprising the steps of:
   (a) monitoring said local bus to determine if a memory write cycle has been initiated by said CPU;
   (b) determining if ROM space address is on said local bus;
   (c) determining if the cacheable ROM mapped to RAM mode of operating said computer system is enabled; and
   (d) providing a cache entry invalidation signal to said CPU whenever said memory controller determines that a memory write cycle has been initiated with an address on said local bus being in ROM address space while said cacheable ROM mapped to RAM mode of operating said computer system is enabled.

7. Apparatus for maintaining cache integrity in a computer system that includes a central processing unit (CPU), cache memory associated with said CPU, Random Access Memory (RAM), Read Only Memory (ROM), a local memory controller for controlling co-operation between said CPU, cache memory, RAM and ROM, and a local bus for interconnecting said local memory controller and said CPU, wherein said computer system is capable of supporting a cacheable ROM mapped to RAM mode of operation, comprising:
   (a) detection means, coupled to said CPU via said local bus, for detecting a CPU write to ROM operation when the cacheable ROM mapped to RAM mode of operation of said computer system is enabled; and
   (b) signalling means, coupled to said CPU via said local bus, responsive to the detection of a CPU write to ROM operation by said detection means, for providing a cache entry invalidation signal to said CPU whenever a CPU write to ROM operation occurs with ROM mapped to RAM space being cacheable.

8. Apparatus as set forth in claim 7 wherein said CPU, in response to said cache entry invalidation signal, is operative to invalidate any cache entry in said cache memory corresponding to a data entry located at a target address of said CPU write to ROM operation.

9. Apparatus as set forth in claim 7 wherein said CPU is operative to place a target address of said CPU write to ROM operation on said local bus and invalidate any cache entry corresponding to an address on said local bus in response to said invalidation signal.

10. Apparatus as set forth in claim 7 wherein said detection means further comprises:
    (a) means for determining if a memory write cycle is in progress;
    (b) means for determining if a ROM space address is on said local bus; and
    (c) means for determining if the cacheable ROM mapped to RAM mode of operating said computer system is enabled.

11. A memory controller for maintaining cache data integrity in a computer system that includes a central processing unit (CPU), cache memory associated with said CPU, Random Access Memory (RAM), Read Only Memory (ROM), and a local bus for interconnecting said memory controller and said CPU, wherein said computer system is capable of supporting a plurality of operating modes including a cacheable ROM mapped to RAM mode of operation, comprising:
    (a) memory write cycle detection means, coupled to said local bus, for determining if a memory write cycle has been initiated by said CPU;
    (b) ROM address space detection means, coupled to said local bus, for determining if a ROM space address is on said local bus;
    (c) mode determination means for determining if the cacheable ROM mapped to RAM mode of operating said system is enabled; and
    (d) means for providing a cache entry invalidation signal to said CPU whenever said memory controller determines that a memory write cycle has been initiated with an address on said local bus being in ROM address space while said cacheable ROM mapped to RAM mode of operating said computer system is enabled.

12. A memory controller as set forth in claim 11 further comprising storage means for storing at least one mode enabled bit for indicating which of said plurality of operating modes of said computer system is enabled.

13. A computer system, including cache memory that supports a cacheable ROM mapped to RAM mode of operation and maintains cache integrity whenever a CPU write to ROM operation is performed with said cacheable ROM mapped to RAM mode being enabled, comprising:
    (a) a central processing unit (CPU);
    (b) a cache memory associated with said CPU;
    (c) a Random Access Memory (RAM);
    (d) a Read Only Memory (ROM;
    (e) a local memory controller for controlling cooperation between said CPU, said cache memory, said RAM and said ROM;
    (f) a local bus for interconnecting said local memory controller and said CPU;
    (g) detection means, coupled to said CPU via said local bus, for detecting a CPU write to ROM operation when the cacheable ROM mapped to RAM mode of operation of said computer system is enabled; and
    (h) signalling means, coupled to said CPU via said local bus, responsive to the detection of a CPU write to ROM operation by said detection means, for providing a cache entry invalidation signal to said CPU whenever a CPU write to ROM operation occurs with ROM mapped to RAM space being cacheable.

14. A computer system as set forth in claim 13 wherein said CPU, in response to said cache entry invalidation signal, is operative to invalidate any cache entry in said cache memory corresponding to a data entry located at a target address of said CPU write to ROM operation.

15. A computer system as set forth in claim 13 wherein said CPU is operative to place a target address of said CPU write to ROM operation on said local bus and invalidate any cache entry corresponding to an address on said local bus in response to said invalidation signal.

16. A computer system as set forth in claim 13 wherein said detection means further comprises:
   (a) means for determining if a memory write cycle is in progress;
   (b) means for determining if a ROM space address is on said local bus; and
   (c) means for determining if the cacheable ROM mapped to RAM mode of operating said computer system is enabled.

17. A computer system including a memory controller for maintaining cache data integrity, wherein said system includes a central processing unit (CPU), cache memory associated with said CPU, Random Access Memory (RAM), Read Only Memory (ROM), and a local bus for interconnecting said memory controller and said CPU, and further wherein said computer system is capable of supporting a cacheable ROM mapped to RAM mode of operation, comprising:
   (a) memory write cycle detection means for determining if a memory write cycle has been initiated by said CPU;
   (b) ROM space address detection means for determining if a ROM space address is on said local bus;
   (c) mode determination means for determining if the cacheable ROM mapped to RAM mode of operating said computer system is enabled; and
   (d) means for providing a cache entry invalidation signal to said CPU whenever a memory write cycle has been initiated with a ROM space address on said local bus while said cacheable ROM mapped to RAM mode of operating said computer system is enabled.

18. A computer system as set forth in claim 17 wherein said memory write cycle detection means, said ROM space address detection means, said mode determination means and said means for providing a cache entry invalidation signal, are all incorporated in said memory controller.

* * * * *